US008676362B2

(12) United States Patent
Gabel et al.

(10) Patent No.: US 8,676,362 B2
(45) Date of Patent: Mar. 18, 2014

(54) ENCAPSULATION OF HIGH DEFINITION AUDIO DATA OVER AN INPUT/OUTPUT INTERCONNECT

(75) Inventors: Douglas Gabel, Hillsboro, OR (US); David Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1510 days.

(21) Appl. No.: 11/853,149

(22) Filed: Sep. 11, 2007

(65) Prior Publication Data

US 2009/0069910 A1     Mar. 12, 2009

(51) Int. Cl.
*G06F 17/00*      (2006.01)
(52) U.S. Cl.
USPC .......................................................... 700/94
(58) Field of Classification Search
USPC ............. 700/94; 719/165, 162; 380/200, 217, 380/239, 241; 341/158
See application file for complete search history.

(56) References Cited

U.S. PATENT DOCUMENTS

| 7,334,107 | B2 * | 2/2008 | Schoinas et al. | 711/207 |
| 7,502,470 | B2 * | 3/2009 | Hanko et al. | 380/200 |
| 2002/0118679 | A1 * | 8/2002 | Eyer | 370/389 |
| 2006/0206618 | A1 * | 9/2006 | Zimmer et al. | 709/231 |
| 2007/0121620 | A1 * | 5/2007 | Yang et al. | 370/389 |
| 2007/0252746 | A1 * | 11/2007 | Hoffert et al. | 341/158 |
| 2008/0148063 | A1 * | 6/2008 | Hanko et al. | 713/189 |

* cited by examiner

*Primary Examiner* — Andrew C Flanders
(74) *Attorney, Agent, or Firm* — Blakely, Sokoloff, Taylor & Zafman LLP

(57) ABSTRACT

Embodiments of the invention are generally directed to systems, methods, and apparatuses for encapsulation of high definition audio data over an input/output interconnect. In some embodiments, a system includes tunneling logic coupled with a high definition (HD) audio controller. The tunneling logic may receive digital audio data from the HD audio controller, encapsulate the digital audio data in a message suitable for an in-band input/output (IO) interconnect, and send the message to an add-in graphics card via the in-band input/output IO interconnect. Other embodiments are described and claimed.

18 Claims, 4 Drawing Sheets

ENCAPSULATION OF HIGH DEFINITION AUDIO DATA OVER AN INPUT/OUTPUT INTERCONNECT

TECHNICAL FIELD

Embodiments of the invention generally relate to the field of information technology and, more particularly, to systems, methods and apparatuses for encapsulation of media data over an input/output interconnect.

BACKGROUND

Interfaces that combine audio and video on one connection are becoming increasingly popular. Examples of such interfaces include the High-Definition Multimedia Interface (HDMI) and the DisplayPort interface. HDMI refers to technology based, at least in part, on any of the HDMI specifications including, for example, version 1.1 released on May 20, 2004. DisplayPort refers to technology based, at least in part, on any of the DisplayPort standards including, for example, the "DisplayPort 1.1 Standard" promulgated by the Video Electronics Standards Association (Apr. 2, 2007). The consumer electronics industry, in particular, provides a large number of products that implement the HDMI interface.

The adoption of these interfaces presents a challenge to the computer industry because, within a typical computer, the audio and video processing units are not located in the same components. Instead, the video processing unit is typically connected to one element of a chipset (e.g., a graphics add-in card connected to (or integrated with) a memory controller hub) and the audio processing unit is typically connected to another element of the chipset (e.g., a high-definition audio controller connected to (or integrated with) an input/output controller hub).

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to systems, methods, and apparatuses for encapsulation of high definition audio data over an input/output (IO) interconnect. In some embodiments, a system includes tunneling logic coupled with a high definition (HD) audio controller. The tunneling logic may receive media data from the HD audio controller, encapsulate the media data in a message suitable for an in-band IO interconnect, and send the message to an add-in graphics card via the in-band IO interconnect.

Figure 1:
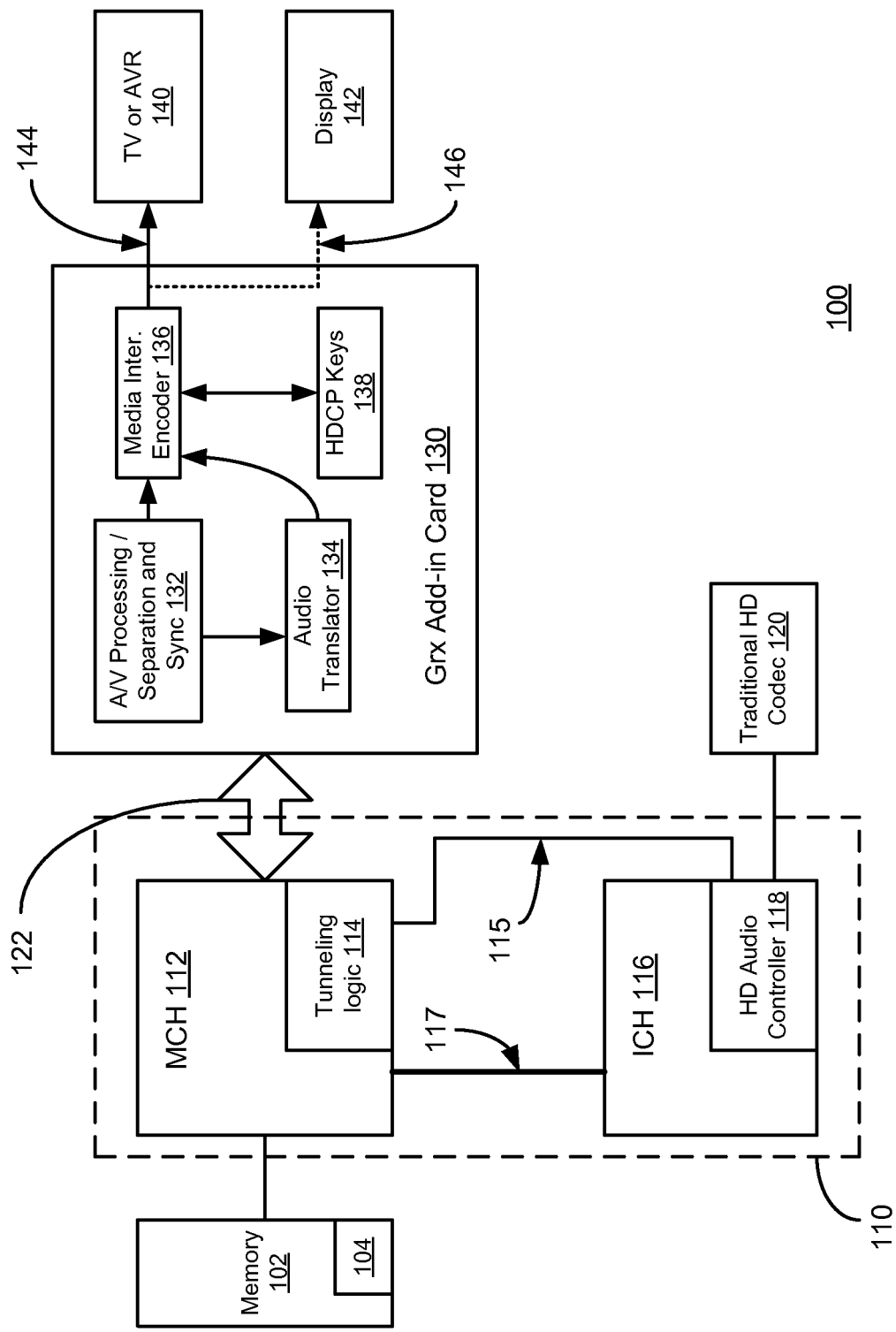
FIG. 1 is a high-level block diagram illustrating selected aspects of a computing system implemented according to an embodiment of the invention.

FIG. 1 is a high-level block diagram illustrating selected aspects of a computing system implemented according to an embodiment of the invention. System 100 includes memory 102, chipset 110, and add-in graphics card 130. In alternative embodiments, system 100 may have more elements, fewer elements, and/or different elements.

Memory 102 provides, at least in part, the main system memory for system 100. Memory 102 may include dynamic random memory devices (DRAMs), memory modules, flash memory devices and the like. Memory system 102 may store media data 104. Media data 104 may be any of a wide array of data to provide media content such as audio data and/or video data. In some embodiments, media data 104 is high definition audio data. The term "high definition audio data" refers to data that provides high definition audio content when processed by a suitable audio component. An example of high definition audio data is digital audio sampled at 96 KHz, using 24-bit samples. It is to be appreciated, however, that high definition audio data may be sampled at a different frequency and/or using a different number of bits. In addition, media data 104 may be nearly any kind of media data including, for example, lower-quality audio data, video data, and the like.

Chipset 110 includes one or more integrated circuits which assist in the transfer of information between one or more processors (not shown) and the other components of system 100. In the illustrated embodiment, chipset 110 includes memory controller hub (MCH) 112 and input/output (IO) controller hub 116. In alternative embodiments, chipset 110 may include more elements, fewer elements, and/or different elements. In some embodiments, some of the functionality provided by chipset 110 is integrated with the processor(s) (not shown). In some embodiments, some or all of the functionality illustrated in chipset 110 is integrated into a single chip.

ICH 116 includes HD audio controller 118. HD audio controller 118 includes logic for routing digital audio data to various endpoints. For example, HD audio controller 118 may include a direct memory access (DMA) engine to transfer data between memory 102 and various endpoints. ICH 116 may be coupled with HD codec 120 to stream audio data to/from one or more audio devices (e.g., speakers, microphones, etc.) and HD audio controller 118. In alternative embodiments, HD audio controller 118 is located in MCH 112 (or another component of chipset 110).

MCH 112 includes, inter alia, tunneling logic 114. In some embodiments, tunneling logic 114 provides a number of functions to support the tunneling of media data over in-band IO interconnect 122. Tunneling logic 114 is further discussed below with reference to FIGS. 2-5.

As used herein, the term "in-band" refers to a preexisting element of system 100 that provides infrastructure. That is, "in-band" refers to an element of the system that provided infrastructure for systems that did not include embodiments of the invention. For example, in-band IO interconnect 122 may be based on a conventional IO technology such PCI Express. PCI Express refers to technology based on any of the PCI Express specifications including, for example, the "PCI Express Base Specification Revision 2.0" released on Dec. 20, 2006.

Graphics card 130 provides media processing for system 100. For example, graphics card 130 may generate media streams and/or receive media streams (e.g., over IO interconnect 122) and provide media content to devices over connections 144 and 146. In some embodiments, graphics card 130 provides combined audio and visual data through (at least) one of its output connections. For example, in the illustrated embodiment, graphics card 130 provides combined audio and visual data over interconnect 144 (e.g., based, at least in part, on the HDMI specification).

In the illustrated embodiment, graphics card 130 includes audio/visual (A/V) processing logic 132, audio translator 134, media encoder 136, and HDCP (High-bandwidth Digital Content Protection) keys 138. Logic 132 may provide a variety of functions including, for example, audio processing, video processing, and the separation and synchronization of A/V data. In some embodiments, logic 132 recognizes that a message received from IO interconnect 122 includes audio data and forwards the message to audio translator 134.

Audio translator 134 includes logic to translate the format of a message from a format that is suitable for IO interconnect 122 to a format that is suitable for encoder 136. Encoder 136 includes logic to encode a media stream for output to a media device such as a television (e.g., 140). In some embodiments, encoder 136 includes logic to combine video data provided by logic 132 with audio data provided by translator 134 to produce a media stream that has combined audio and visual data. In some embodiments, encoder 136 is an HDMI encoder. In alternative embodiments, graphics card 130 may include more elements, fewer elements, and/or different elements. For example, in some embodiments, graphics card 130 may include elements to support a DisplayPort interconnect (which also has combined audio and video data).

Figure 2:
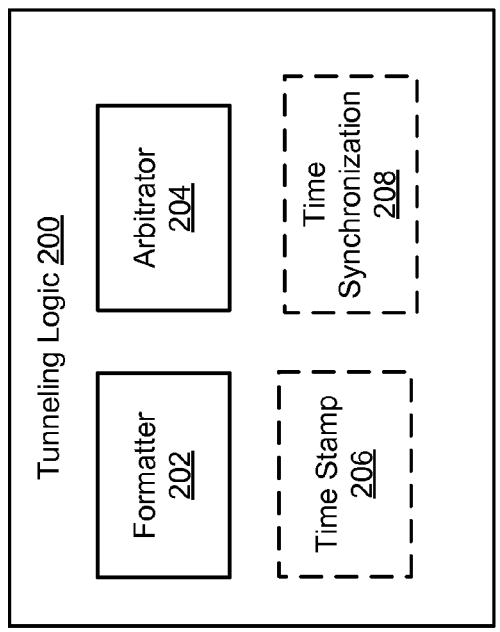
FIG. 2 is a block diagram illustrating selected aspects of tunneling logic implemented according to an embodiment of the invention.

FIG. 2 is a block diagram illustrating selected aspects of tunneling logic 200 implemented according to an embodiment of the invention. Tunneling logic 200 includes formatter 202, arbitrator 204, time stamp logic 206, and time synchronization logic 208. In alternative embodiments, tunneling logic 200 may include more elements, fewer elements, and/or different elements.

Formatter 202 provides logic to receive an audio payload (e.g., from controller 118, shown in FIG. 1) and to format the payload so that it can be transferred over an in-band IO interconnect (e.g., IO interconnect 122, shown in FIG. 1). For example, formatter 202 may add elements to the audio payload (such as a header, footer, etc.) so that the payload is appropriately formatted for the IO interconnect. In some embodiments, the interconnect between the HD audio controller and formatter 202 (e.g., interconnect 117, shown in FIG. 1) may be an in-band interconnect. In such embodiments, formatter 202 may add elements to the audio payload so that the payload is appropriately formatted for the chipset interconnect (interconnect 117, shown in FIG. 1).

In some embodiments, formatter 202 formats the audio payload so that it can be transferred over a PCI Express based IO interconnect. That is, formatter 202 may add components to the audio payload to format the audio payload as a PCI Express (PCIe) message. In some embodiments, the message may be a PCIe vendor defined message (VDM). An example of an audio payload formatted as a PCIe VDM is further discussed below with reference to FIG. 3.

Arbitrator 204 provides logic to arbitrate the transfer of audio data from chipset 110 to graphics card 130. In some embodiments, arbitrator 204 determines the proper flow of audio data to graphics card 130 to reduce or prevent underflows and/or overflows of audio data. The arbitration algorithms may be based on the size of the buffers on either side of the interconnect, the size of the data payloads in the messages sent over the interconnect, and/or the frequency at which the messages are transferred across the interconnect. In some embodiments, some or all of the functions of arbitrator 204 are assimilated into the arbitration scheme for the interconnect. For example, if the interconnect is a PCIe interconnect, then some or all of the functions of arbitrator 204 may be assimilated into the arbitration scheme for the PCIe interconnect.

Timestamp logic 206 is an optional element that provides timestamp information to resolve synchronization issues between audio and video streams. In some embodiments, the video data and the audio data take different paths from memory (e.g., memory 102, shown in FIG. 1) to the graphics card (e.g., graphics card 130, shown in FIG. 1). Since the video and audio streams follow different paths they may not be synchronized with each other when they are recombined (e.g., by encoder 136, shown in FIG. 1). In some embodiments, timestamp logic 206 provides timestamp information for the audio stream. When the audio stream is combined with the video stream, the encoder may use the timestamp information to synchronize the audio stream with the video stream. An example of an audio message having timestamp information is shown below in FIG. 3.

Figure 3:
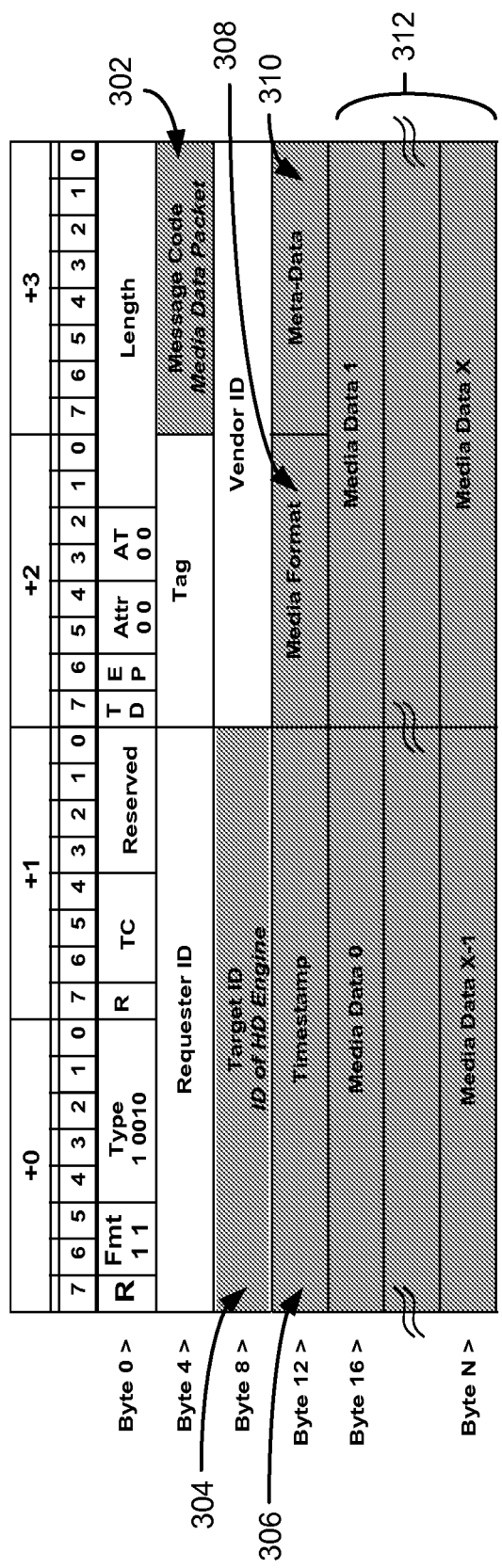
FIG. 3 is a block diagram illustrating selected aspects of a media message implemented according to an embodiment of the invention.

FIG. 3 is a block diagram illustrating selected aspects of a media message implemented according to an embodiment of the invention. In the illustrated embodiment, message 300 is formatted as a PCIe VDM. In alternative embodiments, message 300 may be formatted differently. The first four bytes of message 300 may provide routine information, such as message length, to enable message 300 to be transferred on a PCIe interconnect. Byte 8 (302) provides an indicator that message 300 includes media data (e.g., HD audio data). Byte 9 (304) specifies the target identifier (e.g., the identifier associated with the graphics card that receives the message). In some embodiments, bytes 13-14 (306) provide a timestamp to enable the audio stream to be synchronized with a video stream. Byte 15 (308) identifies the media format corresponding to the media data in bytes 17 and above. It is to be appreciated that message 300 may include nearly any number of media data bytes (312).

In some embodiments, message 300 may include additional data corresponding to the media data bytes (312). For example, message 300 may include information about sample rate, content protection scheme, compression format, encoding or decoding format, media artist, media title, and the like. Some of the data may be provided sequentially in multiple messages. For example, a song title might be sent one character per packet, with the complete title recovered at the receiving end by buffering each received character. Byte 16 (310) illustrates one example of a field that may be used to convey this additional information.

This novel mechanism for transferring media data (e.g., HD audio data) throughout a platform creates the potential problem that the codec located on the graphics card may use a different clock source than the media controller in the chipset (e.g., HD audio controller 118, shown in FIG. 1). Over time, there may be drift between the two clocks that can cause the media data to overflow or underflow, which would be undesirable because this may lead to a user perceiving a "glitch" in the media.

The system may include a mechanism (e.g., time synchronization logic 208, shown in FIG. 2) for adjusting the clock of the transmitter to accommodate the receiver's (e.g., codec's) clock, which may be considered the master reference clock. In some embodiments, the adjustment is communicated through a VDM transmitted as needed by the codec back to the media engine. The timing adjustment VDM may instruct the media engine to advance or delay its sample clock relative to its local clock (see, e.g., FIG. 4). An alternative mechanism for synchronization includes delaying or advancing the digital audio/video samples by a certain number of samples (e.g., depending on the samples per clock) to maintain synchronization. This mechanism does not need clock circuitry to speed-up or slow-down the speed of the clock.

Figure 4:
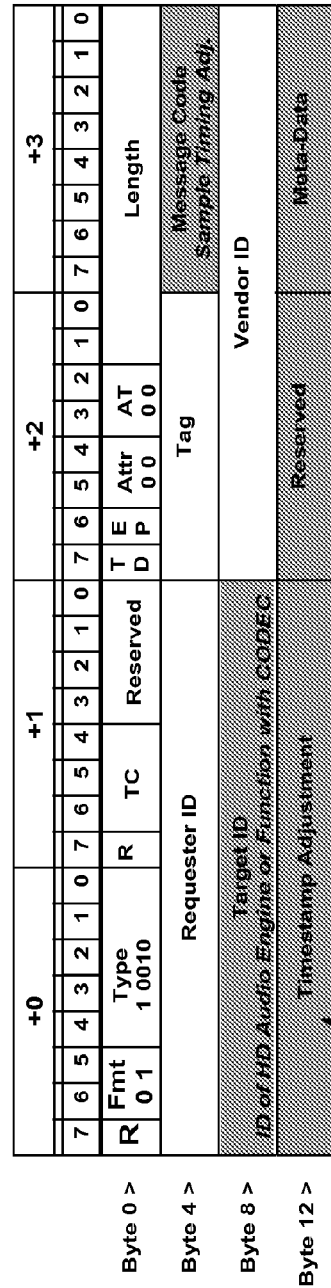
FIG. 4 is a block diagram illustrating selected aspects of a timing adjustment message implemented according to an embodiment of the invention.

FIG. 4 is a block diagram illustrating selected aspects of a timing adjustment message implemented according to an embodiment of the invention. In some embodiments, message 400 may include timing adjustment information that is encoded as a signed number representing the number of sample times by which to adjust. A positive number may indicate the engine is to advance its timing (e.g., speed up) and a negative number may indicate that the engine is to delay its timing (e.g., slow down). In some embodiments, the timing adjustment occurs only when the timing adjustment message is received. Thus, a codec may need to implement sufficient buffering to accommodate the timing uncertainty caused by the codec's inability to know when the message has been processed by the engine.

Figure 5:
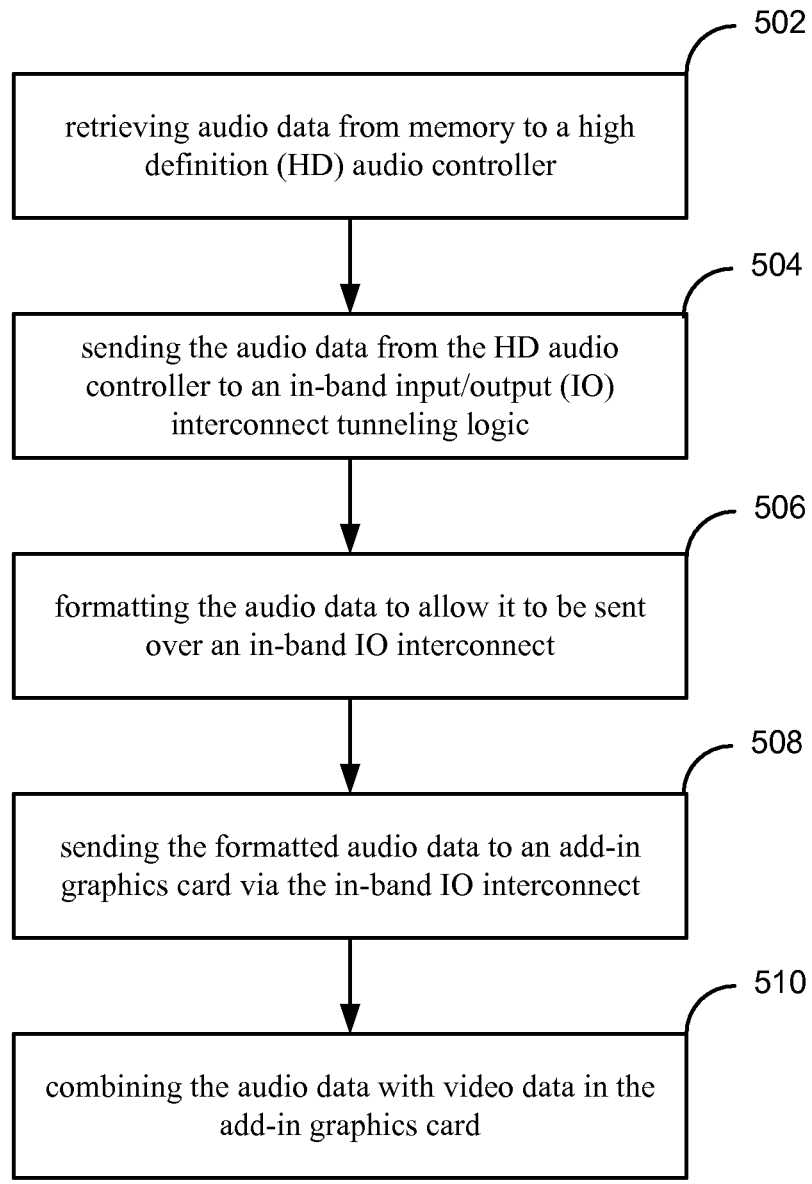
FIG. 5 is a flow diagram illustrating selected aspects of a method for tunneling media data over an input/output interconnect according to an embodiment of the invention.

FIG. 5 is a flow diagram illustrating selected aspects of a method for tunneling audio data (e.g., HD audio data) over an in-band IO interconnect according to an embodiment of the invention. Referring to process block 502, an audio controller (e.g., HD audio controller 118, shown in FIG. 1) retrieves audio data (e.g., HD audio data 104) from memory (e.g., memory 102). The audio controller sends the audio data to tunneling logic (e.g., tunneling logic 114) at 504. In some embodiments, the audio controller sends the audio data to the tunneling logic via an isochronous media link (e.g., link 115 shown in FIG. 1).

Referring to process block 506, the audio data is formatted so that it can be sent over an in-band IO interconnect. In some embodiments, the in-band IO interconnect is based, at least in part, on the PCIe specification. In such embodiments, the audio data may be formatted as a PCIe VDM (e.g., message 300, shown in FIG. 3). In alternative embodiments, the audio data may be formatted differently.

Referring to process block 508, the formatted audio data is sent to an add-in graphics card via the in-band IO interconnect. The audio data may be combined with video data in the add-in graphics card. For example, an HDMI encoder may combine the audio data with HD video data to provide a combined A/V media stream. In some embodiments, the combined A/V media stream is provided to a TV (or other display device) through a single connection (e.g., connection 144, shown in FIG. 1).

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. An apparatus comprising:
a high-definition (HD) audio controller to obtain digital audio data from main system memory; and
tunneling logic coupled with the HD audio controller, the tunneling logic to receive the digital audio data from the HD audio controller via an isochronous media link, to encapsulate the digital audio data in a message suitable for an in-band input/output (IO) interconnect, and to send the message to an add-in graphics card via the in-band IO interconnect to adjust a clock signal of the main system memory to accommodate a clock signal of the HD audio controller through a PCI Express (PCIe) vendor defined message (VDM) transmitted as needed to the HD audio controller, wherein the message includes at least a message length, an indicator that the message includes media data, a target identifier, a timestamp to enable the audio stream to be synchronized with a video stream and an indication of a media format corresponding to media data in the message.

2. The apparatus of claim 1, wherein the in-band IO interconnect is based, at least in part, on the PCI Express specification.

3. The apparatus of claim 1, wherein the add-in graphics card provides a media interface that includes both visual information and audio information.

4. The apparatus of claim 3, wherein the media interface is based, at least in part, on the high-definition multimedia interface (HDMI).

5. The apparatus of claim 3, wherein the media interface is based, at least in part, on the DisplayPort interface.

6. The apparatus of claim 1, wherein the tunneling logic includes formatter logic to encapsulate the digital audio data in a message suitable for an in-band IO interconnect.

7. The apparatus of claim 1, wherein the tunneling logic includes arbitration logic to determine a flow of digital audio data to the add-in graphics card.

8. The apparatus of claim 1, wherein the tunneling logic includes timestamp logic to provide a timestamp for the digital audio data.

9. The apparatus of claim 8, wherein the timestamp is expressed in units of a digital audio rate associated with the digital audio data.

10. The apparatus of claim 1, wherein the message includes at least one of:
- routing information to specify a media stream associated with the digital audio data;
- sample rate information associated with the digital audio data;
- content protection information associated with the digital audio data;
- encryption information associated with the digital audio data; and
- descriptive information associated with the digital audio data.

11. The apparatus of claim 1, wherein the HD audio controller and the logic reside on the same integrated circuit.

12. A method comprising:
- retrieving digital audio data from memory to a high definition (HD) audio controller;
- sending the digital audio data from the HD audio controller to an in-band input/output (IO) interconnect tunneling logic via an isochronous media link;
- formatting the digital audio data to allow it to be sent over an in-band IO interconnect;
- sending the formatted digital audio data to an add-in graphics card via the in-band IO interconnect; and
- adjusting a clock signal of the main system memory to accommodate a clock signal of the HD audio controller through a PCI Express (PCIe) vendor defined message (VDM) transmitted as needed to the HD audio controller, wherein the message includes at least a message length, an indicator that the message includes media data, a target identifier, a timestamp to enable the audio stream to be synchronized with a video stream and an indication of a media format corresponding to media data in the message.

13. The method of claim 12, wherein the in-band 10 interconnect is based, at least in part, on PCI Express technology.

14. The method of claim 13, wherein formatting the digital audio data to allow it to be sent over the in-band IO interconnect comprises:
- formatting the digital audio data as a PCI Express message to be sent over the in-band IO interconnect.

15. The method of claim 12 further comprising: combining the audio data with video data in the add-in graphics card.

16. A system comprising:
- a dynamic random access memory (DRAM) to store digital audio data;
- a high-definition (HD) audio controller to obtain the digital audio data from the DRAM; and
- tunneling logic coupled with the HD audio controller, the tunneling logic to receive the digital audio data from the HD audio controller via an isochronous media link, to encapsulate the digital audio data in a message suitable for an in-band input/output (IO) interconnect, and to send the message to an add-in graphics card via the in-band IO interconnect to adjust a clock signal of the main system memory to accommodate a clock signal of the HD audio controller through a PCI Express (PCIe) vendor defined message (VDM) transmitted as needed to the HD audio controller, wherein the message includes at least a message length, an indicator that the message includes media data, a target identifier, a timestamp to enable the audio stream to be synchronized with a video stream and an indication of a media format corresponding to media data in the message.

17. The system of claim 16, wherein the in-band IO interconnect is based, at least in part, on the PCI Express specification.

18. The apparatus of claim 16, wherein the add-in graphics card provides a media interface that includes both visual information and audio information.

* * * * *